(12) United States Patent
Anson

(10) Patent No.: US 6,956,587 B1
(45) Date of Patent: Oct. 18, 2005

(54) METHOD OF AUTOMATICALLY CROPPING AND ADJUSTING SCANNED IMAGES

(75) Inventor: David L. A. Anson, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 98 days.

(21) Appl. No.: 10/697,729

(22) Filed: Oct. 30, 2003

(51) Int. Cl.[7] .............................................. G06K 9/36
(52) U.S. Cl. ...................... 345/649; 345/619; 345/620; 345/621; 345/622; 382/173; 382/293; 382/296; 382/297; 382/298
(58) Field of Search 345/649, 619–622; 382/173–180, 382/293–298

(56) References Cited

U.S. PATENT DOCUMENTS

| | | | |
|---|---|---|---|
| 5,187,776 A * | 2/1993 | Yanker | 715/800 |
| 5,233,332 A * | 8/1993 | Watanabe et al. | 345/649 |
| 5,473,740 A * | 12/1995 | Kasson | 345/628 |
| 5,790,696 A * | 8/1998 | Takahashi | 382/177 |
| 5,974,199 A * | 10/1999 | Lee et al. | 382/289 |
| 6,360,026 B1 * | 3/2002 | Kulkarni et al. | 382/289 |
| 6,430,320 B1 * | 8/2002 | Jia et al. | 382/289 |
| 6,560,376 B2 * | 5/2003 | Kimbell et al. | 382/296 |
| 6,785,428 B1 * | 8/2004 | Stolin | 382/295 |
| 2003/0035593 A1 * | 2/2003 | Rombola et al. | 382/289 |
| 2003/0058257 A1 * | 3/2003 | Yin | 345/629 |
| 2003/0152291 A1 * | 8/2003 | Cheatle | 382/296 |
| 2004/0013318 A1 * | 1/2004 | Simske et al. | 382/289 |

OTHER PUBLICATIONS

Wenyin et al., "MiAlbum—A System for Home Photo Management Using the Semi-Automatic Image Annotation Approach," Proceedings of the Eighth ACM International Conference on Multimedia, 2000, pp. 479-480, ACM Press, New York, U.S.A.

Sojka, "A New Algorithm for Detecting Corners in Digital Images," Proceedings of the 18th Spring Conference on Computer Graphics, 2002, pp. 55-62, ACM Press, New York, U.S.A.

Griffith, "Mathematical Models for Automatic Line Detection," Journal of the Association for Computing Machinery, Jan. 1973, pp. 62-80, vol. 20, No. 1, Massachusetts Institute of Technology, Cambridge, Massachusetts, U.S.A.

* cited by examiner

*Primary Examiner*—Matthew C. Bella
*Assistant Examiner*—Daniel Chung
(74) *Attorney, Agent, or Firm*—Senniger Powers

(57) ABSTRACT

A computerized method and computer readable medium for adjusting a digital image obtained from scanning a document. An application processes the digital image to discern a border portion from an image portion. The application processes the digital image to determine whether an image portion of the digital image corresponds to a target orientation. If the image portion does not correspond to a target orientation, the application adjusts the image portion to correspond to the target orientation. The application further crops the adjusted image to entirely eliminate the border portion of that image.

25 Claims, 14 Drawing Sheets

FIGURE 4H

|   |   | -1 |   |   |
|---|---|---|---|---|
|   | -1 | -2 | -1 |   |
| -1 | -2 | 16 | -2 | -1 |
|   | -1 | -2 | -1 |   |
|   |   | -1 |   |   |

METHOD OF AUTOMATICALLY CROPPING AND ADJUSTING SCANNED IMAGES

TECHNICAL FIELD

Embodiments of the present invention relate to the field of image cropping and manipulation. In particular, embodiments of this invention relate to automatically adjusting the orientation of a digital image to produce final images that are more immediately useful to the user without requiring further manipulation by the user or computer.

BACKGROUND OF THE INVENTION

When dealing with images that have been imported into a computer from some other medium (such as with a slide scanner, a film scanner, a flatbed scanner, digital camera, etc.) there are almost always two problems. One problem is that the document to be scanned is not always perfectly oriented with respect to the scanning device. For example, a photograph may have been placed on a flatbed scanner slightly crooked so that the edges of the scanned photograph are not perfectly horizontal/vertical relative to the scanning area, or the device may not be calibrated properly. As a result, a digital image of the document generated from the scanning process will also appear crooked when being viewed, for example, on a computer monitor. Another problem is that there is almost always some extra border around the image itself. An extra border may result because the document being scanned has extra white space around it (e.g., slide), or because the document is smaller than the scanning surface of the scanning device. However, the computer user is typically interested in viewing or printing a level image without a border.

Traditional methods of automatic image cropping are often ineffective because they require further manipulation of the image by the user. In particular, these existing cropping methods ignore the orientation issue, and only attempt to address the border removal issue. Such methods yield a final image that remains improperly oriented and, as a result, an image that still contains undesirable border or that has been overly cropped. Thus, the value of traditional methods to the user is considerably less than that of an automated method that consistently produces properly oriented and cropped images.

Thus, the need exists for a method and system for automatically adjusting and cropping a digital image to produce a final image that is immediately useful to the user.

SUMMARY OF THE INVENTION

The invention meets the above needs and overcomes one or more deficiencies in the prior art by providing an improved computer readable medium and computerized method for automatically cropping and adjusting the orientation of a digital image. In one embodiment, the invention utilizes an application to identify at least one edge of the image as a function of pixel values, and compares the identified edge(s) to one or more target edges. By comparing the identified edge to the target edge, the invention determines an amount to rotate the image to achieve a target orientation and/or target size. The features of the present invention described herein are more efficient and easier to implement than currently available techniques as well as being economically feasible and commercially practical.

In accordance with one aspect of the invention, a computerized method is provided for processing an image obtained by scanning. The image includes at least a plurality of pixels, and each of the pixels has a value representative of an optical characteristic of a scanned object. The computerized method includes identifying a plurality of pixels along at least one edge portion of the image as a function of the pixel values. The method also includes defining one or more edges of the image from the identified pixels. The method also includes determining an orientation of the image relative to a target orientation as a function of the defined edges. The method further includes adjusting the orientation of the image portion to correspond to the target orientation.

In accordance with another aspect of the invention, a computer-readable medium having computer-executable instructions for processing a digital image. The digital image includes a border portion and an image portion, wherein the border portion and the image portion each include at least a plurality of pixels, and each of the pixels has a value representative of an optical characteristic of a scanned object. Identifying instructions identify a plurality of pixels along at least one edge portion of the image portion as a function of the pixel values. Pixels in the border portion have substantially different pixel values than said pixels in the image portion of the image, and pixels along the edge portion of the digital image distinguish the image portion of the digital image from the border portion adjacent the edge portion. Defining instructions define one or more edges of the image portion from the identified pixels. Determining instructions determine an orientation of the image portion relative to a target orientation as a function of the defined edges. Adjusting instructions adjusts the orientation of the image portion to correspond to the target orientation. Cropping instructions for cropping the adjusted image portion to eliminate the border portion.

In accordance with yet another aspect of the invention, a system for processing an image. The image includes at least a plurality of pixels, and each of the pixels has a value representative of an optical characteristic of a scanned object. The system stores computer-executable instructions to identify a plurality of pixels along at least one edge portion of the image as a function of the pixel values. The system also stores computer-executable instructions to define one or more edges of the image from the identified pixels. The system also stores computer-executable instructions to determine an orientation of the image relative to a target orientation as a function of the defined edges. The system also stores computer-executable instructions to adjust the orientation of the image portion to correspond to the target orientation. The system further stores computer-executable instructions to cropping the adjusted image to eliminate the border portion.

Alternatively, the invention may comprise various other methods and apparatuses.

Other features will be in part apparent and in part pointed out hereinafter.

BRIEF DESCRIPTION OF THE DRAWINGS

FIG. 4H is an exemplary matrix for implementing an edge detection filter.

Corresponding reference characters indicate corresponding parts throughout the drawings.

DETAILED DESCRIPTION OF THE INVENTION

Figure 1A:
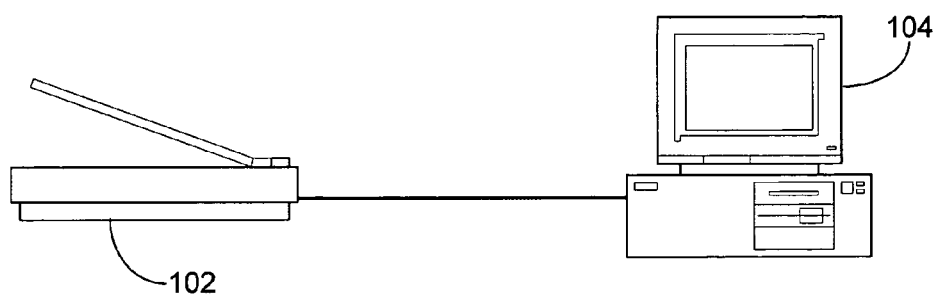
FIG. 1A is an exemplary environment in which the present invention may be utilized to adjust and crop a digital image obtained by scanning.
Figure 1B:
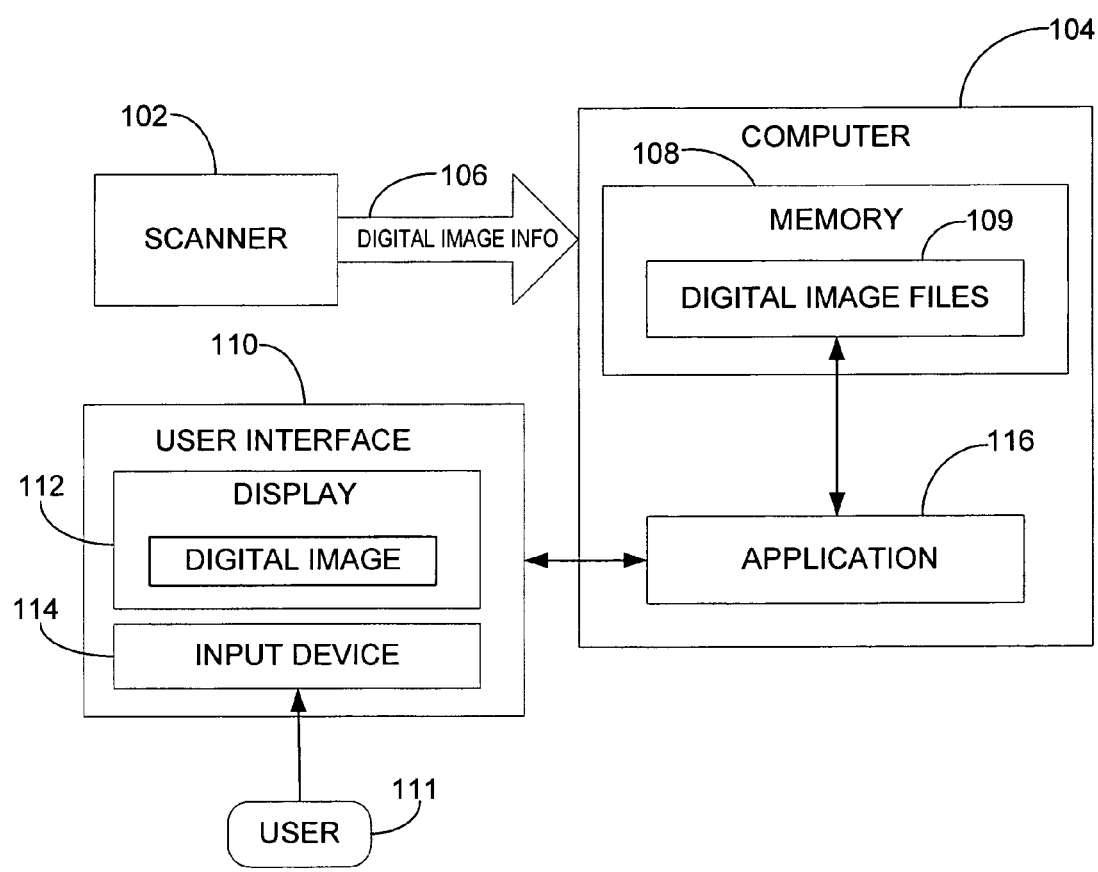
FIG. 1B is an exemplary block diagram illustrating components of a computer system for adjusting and cropping a digital image according to one embodiment of the invention.

Referring now to the drawings, FIGS. 1A and 1B illustrate an exemplary system 100 in which the present invention may be utilized to automatically adjust the orientation and size of a digital image generated by a process such as scanning. In this instance, FIGS. 1A and 1B diagrammatically show a system 100 that employs a scanner 102 and a personal computer (computer) 104 to obtain, display, and manipulate the digital image of a document. Although the invention is described in context of adjusting the orientation and size of a digital image obtained from a scanner, it is contemplated that the invention can be utilized to adjust an image obtained from any input device suitable for importing images to a computer 102.

In the embodiment of FIG. 1A, the scanner 102 scans a document such as a photograph or drawing, and generates digital information representative of the document. As known to those skilled in the art, scanners generate digital information by aiming a light source at the document being scanned, and directing the reflected light (usually through a series of mirrors and lenses) onto a photosensitive element. In conventional scanners, the sensing medium is, for example, an electronic, light-sensing integrated circuit known as a charged coupled device (CCD). Light-sensitive photosites arrayed along the CCD convert levels of brightness into electronic signals that are then processed by a computer into a digital image. More specifically, each photosite in this example produces an electrical signal proportional to the strength of the reflected light that strikes it. The signal, which represents an optical characteristic such as one pixel in the original image, is converted into a binary number and sent to the computer 104. Darker portions of the target document reflect less light and are converted to lower binary numbers. The resolution of a scanner is measured in pixels or dots per inch (dpi). The dpi is a fixed number based on the number of cells in the array and the total area scanned. For example, an array with 2,590 cells covering 8.5 inches gives a resolution of 300 dpi.

The computer 104 is linked to the scanner 102 and receives the generated digital information, as indicated by reference character 106. The computer 104 is responsive to user input and the received digital information to display a digital image, print a hard copy of the digital image, and/or store the digital image in a memory 108. In other words, the digital image is a file 109 that contains color information about each pixel in the digital image for displaying the digital image on a monitor or printing the digital image on paper. The amount of color information captured about each pixel is referred to as bit depth. A bit depth of one (1) bit, also called "bit," is the smallest possible unit of information in a computer about a particular pixel, and indicates that each pixel is either black "0" or white "1." A bit depth of eight (8) bits, also called "grayscale," indicates each pixel is assigned to one of 256 possible shades of gray, each encoded with 8 bits, for example "00001110." A bit depth of twenty-four (24) bits, also called "true color" or "millions of colors," indicates each pixel is assigned to one of 16.7 million possible colors. To be more precise, for each of red, blue, and green, the color is encoded with 8 bits of information. So, 3 colors×8 bits=24 bit.

A user-interface (UI) 110 associated with the computer 104 allows a user 111 to interact with the digital image. For example, the UI 110 may include a display 112 such as a computer monitor for viewing the digital image, and an input device 114 such as a keyboard or a pointing device (e.g., a mouse, trackball, pen, or touch pad) for entering data into the computer 104.

The present invention involves the use of an application 116, which is executed by computer 104 to automatically adjust the orientation of the digital image, and/or to crop the adjusted image, with respect to a reference coordinate system. The application may be a stand-alone application, or integrated within a software application such as any photo manipulation software. As described above, if the document is not aligned properly during the scanning process (e.g., due to user error, hardware calibration, or other reasons), the resulting digital image appears crooked when displayed on the display, or when viewed on a printed hard copy. Moreover, the digital image may also include an undesired border portion. By employing application 116 to automatically adjust the orientation of the digital image and to crop the digital image, the invention provides the user an improved digital image.

Figure 2:
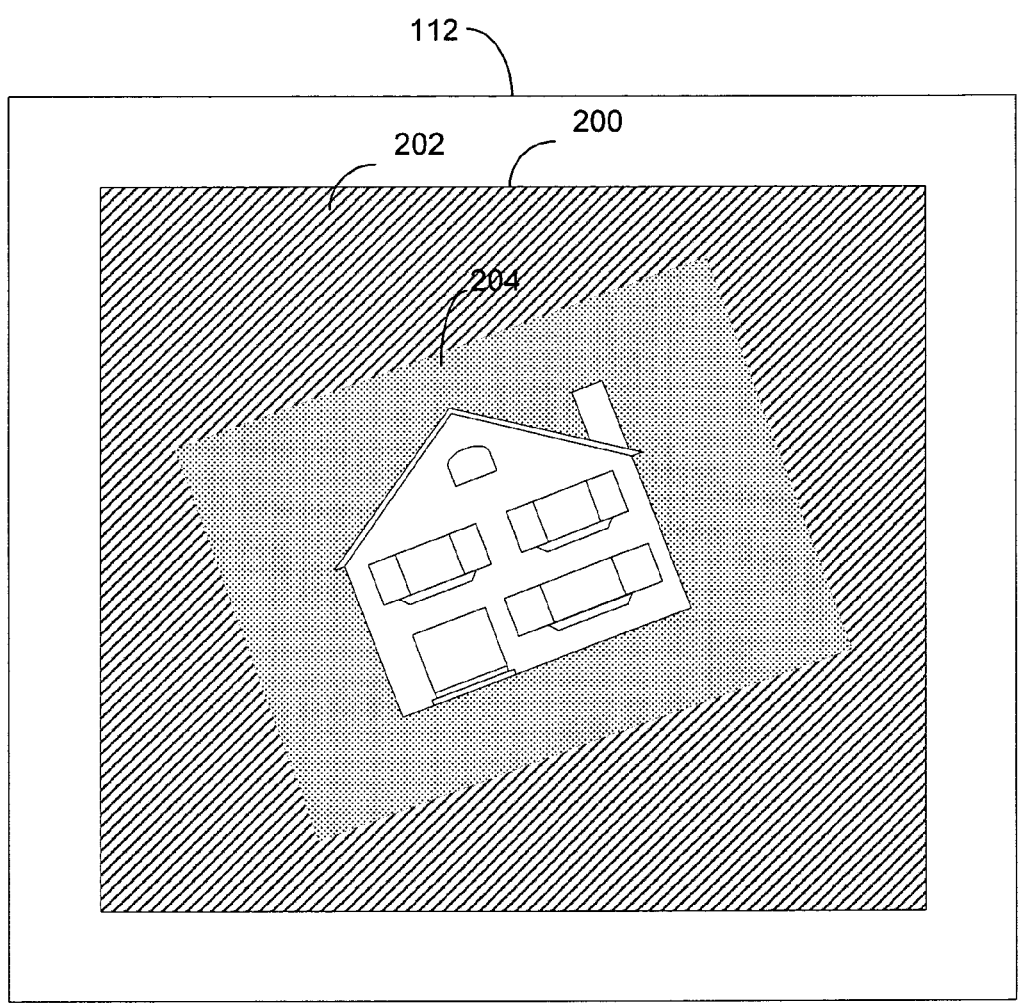
FIG. 2 is a screen shot of a digital image obtained from a scanning process.

Referring next to FIG. 2, an exemplary screen shot of a digital image 200 obtained from a scanning process is shown. The digital image 200 comprises a border portion 202 and an image portion 204. The border portion 202 has a generally rectangular periphery, and includes top and bottom sides that are substantially parallel to a horizontal axis, and includes right and left sides that are substantially parallel to a vertical axis. Those skilled in the art will recognize that the border portion 202 is a generally uniform color such as white or black. The image portion 204 is surrounded by the border portion 202, and has a shape that corresponds to the shape of the scanned document. The image portion 204 generally includes a plurality of colors or a plurality of shades. Although the image portion is illustrated in FIG. 2 as having a generally rectangular shape, as is typically the case for imported or scanned images, it is to be understood that the invention could be used for adjusting an image portion having any shape. As can be see from FIG. 2, the image portion 204 may be crooked (i.e., not level) with respect to horizontal or vertical axes. As described above, the photograph or drawing may have been placed on a flatbed scanner slightly crooked so that the edges of the scanned photograph are not perfectly horizontal and vertical with respect to reference axes. Moreover, there may be unwanted or extra border around the image portion. For instance, the extra border portion 202 may result from scanning a document such as a slide that has an extra white space around it. However, the user typically prefers viewing, posting to the web, or printing a hard copy of a digital image 200 without the border portion 202, and with the image portion 204 leveled or correctly oriented.

Figure 3A:
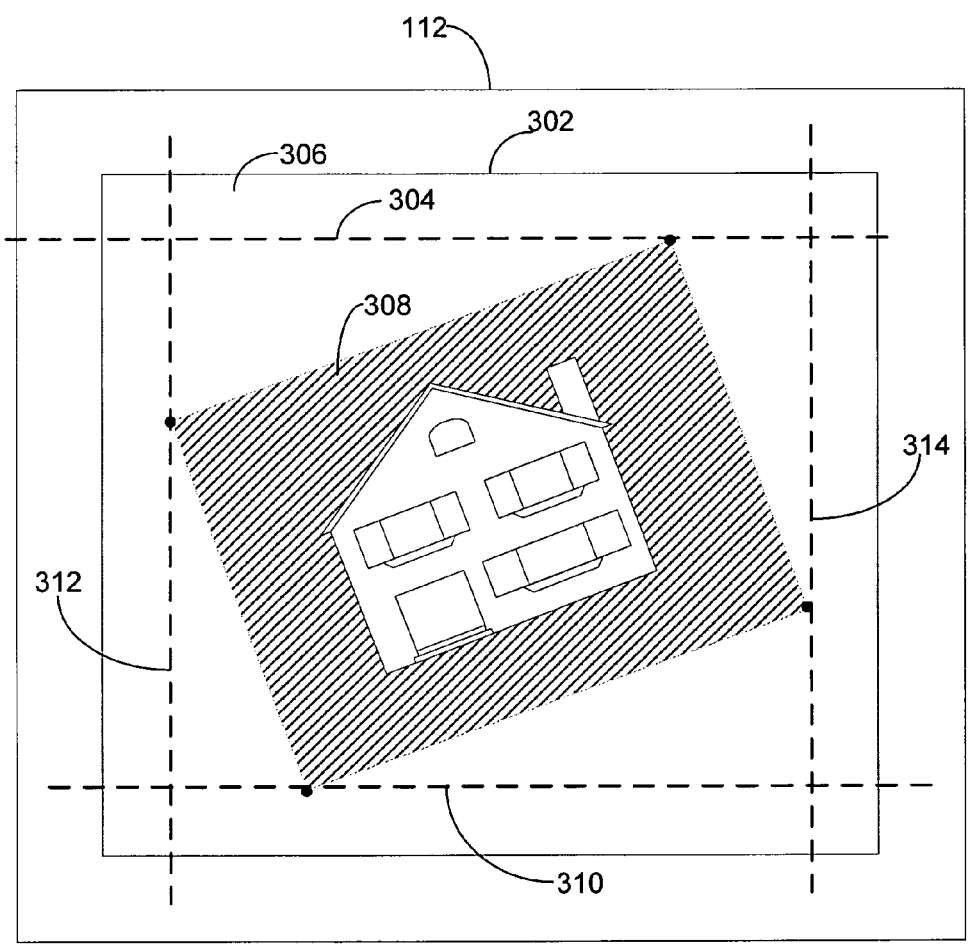
FIGS. 3A and 3B illustrate an exemplary digital image before and after a prior art cropping method.
Figure 3B:
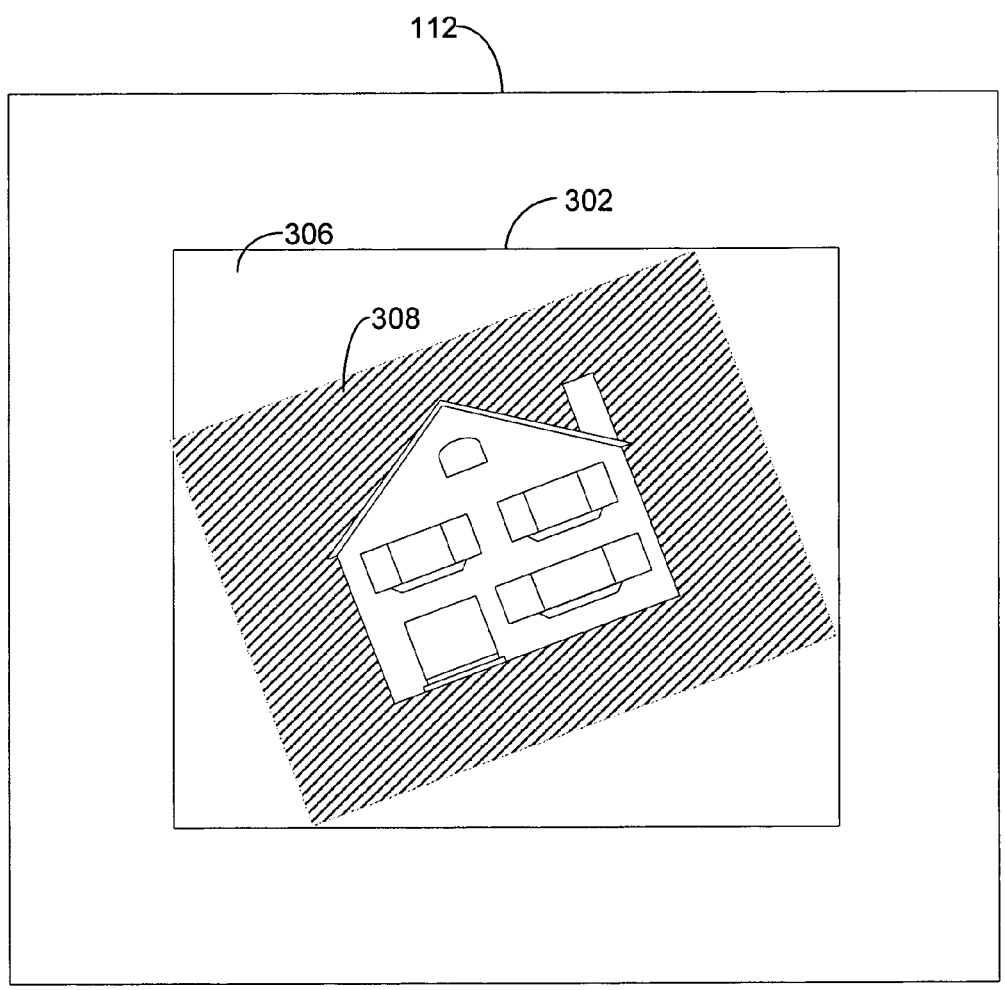

Referring next to FIG. 3A, an exemplary screen shot of an image 302 being processed according to an existing cropping method is shown. According to this prior method, a software application defines "border" pixels as being white and moves an imaginary horizontal line 304 down the image starting from the top of the border portion 306 towards the image portion 308. When pixels under the imaginary line are not border colored (e.g., white), the application defines the position of the line as the new top edge of the image. This process is repeated with a second horizontal line 310 to define a new bottom edge, and with vertical lines 312, 314 to define new left and right edges, respectively. The newly defined edges also define a cropping rectangle, and the application discards any portion of the image located outside of the cropping rectangle. As shown in FIG. 3B, this technique is only marginally useful as it leaves some of the extra border, and does nothing to correct the orientation of the image portion 308. That is, the final image remains improperly oriented and contains some of the original border. Because of these rather significant shortcomings, the value of traditional methods to the user is considerably less than that of the present invention.

Figure 4A:
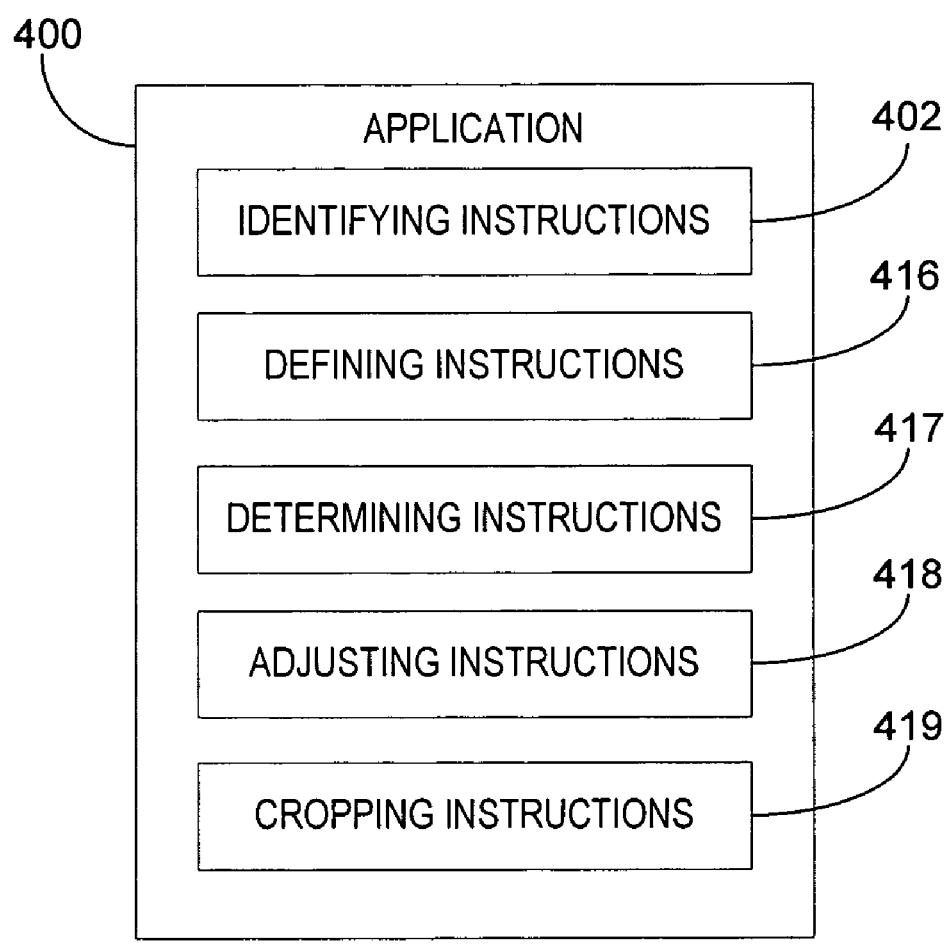
FIG. 4A is an exemplary block diagram illustrating components of an application for automatically adjusting and cropping a digital image according to one preferred embodiment of the invention.

Referring next to FIG. 4A, a block diagram illustrates components of an application 400 for automatically adjusting and/or cropping a digital image 401 obtained by scanning.

Figure 4B:
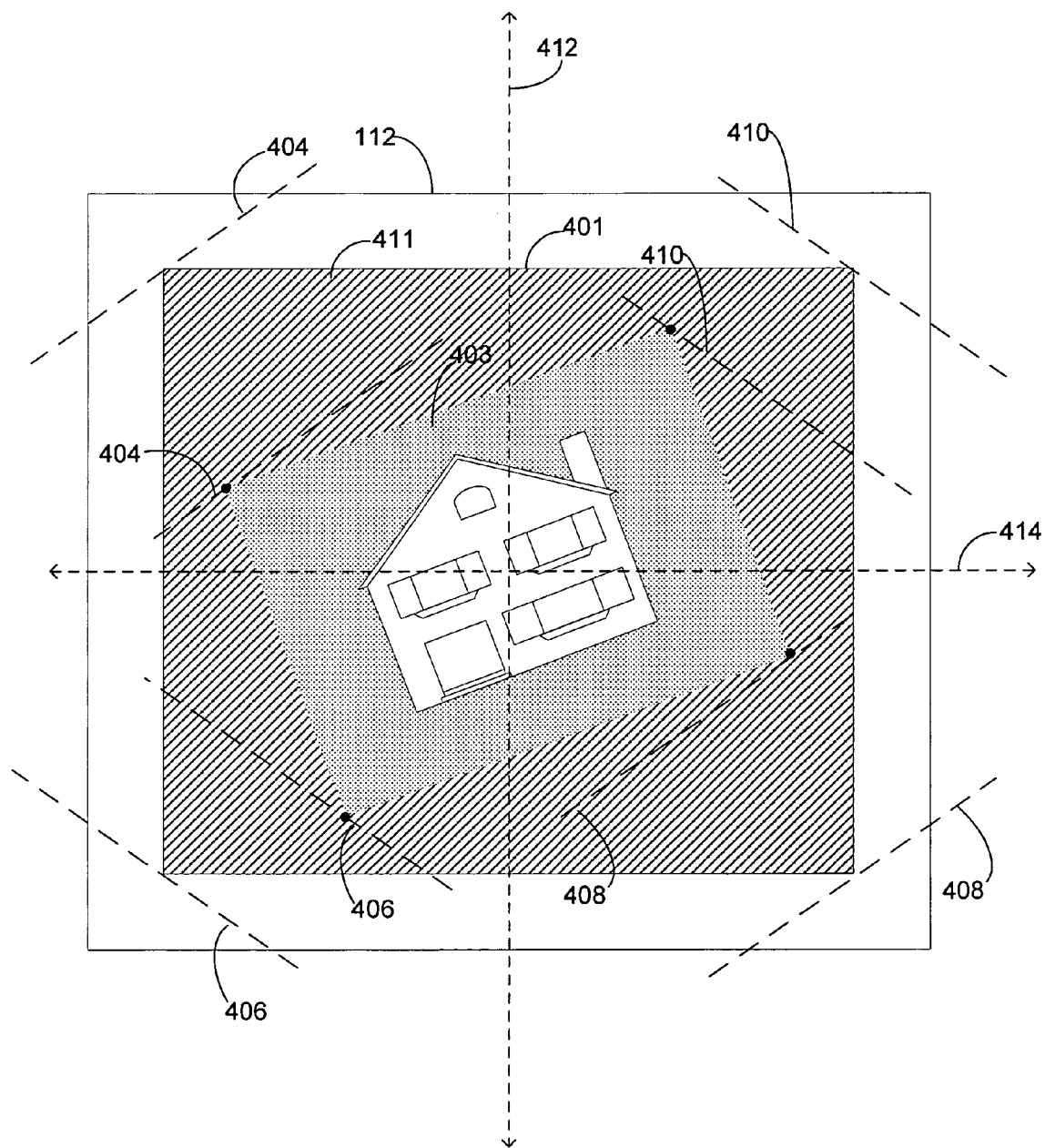
FIG. 4B illustrates the digital image being processed to identify corners of an image portion according one preferred embodiment.

Identifying instructions 402 include instructions for identifying the corners of the image portion 403 of the digital image 401. In one embodiment, identifying instructions 402 include instructions for defining four processing lines 404, 406, 408, and 410 that are aligned diagonally (e.g., 45 degree angle) relative to a target orientation. In this case, the target orientation corresponds to horizontal axis 412, or vertical axis 414 such as shown in FIG. 4B. The diagonal processing lines 404, 406, 408, and 410 are each defined to have an initial position that corresponds to a different corner of the border portion 411 (e.g., each processing line is tangentially aligned to a different corner). The identifying instructions 402 further include instructions for repositioning each of the diagonal processing lines a predetermined distance toward a center of the target orientation until each of the processing lines intersects one of the pixels having a pixel value substantially different than previously processed pixels. In this example, the center of the target orientation corresponds to the intersection of the horizontal and vertical axes 412, 414. As can be seen from the screen shot illustrated in FIG. 4B, the imaginary diagonal lines will each first contact (i.e., intersect) one of the four corners of the digital image. The identifying instructions 402 also include instructions for recording in a memory (e.g., memory 108) the location of the first pixel intersected by each of the processing lines having a pixel value substantially different than previously processed pixels. For example, in the case of an image having pixels with a single bit depth, pixels in the border portion 411 will have a pixel value of 1 (i.e., white), and pixels in the image portion 403 will have a pixel value of 0 (i.e., black).

Figure 4C:
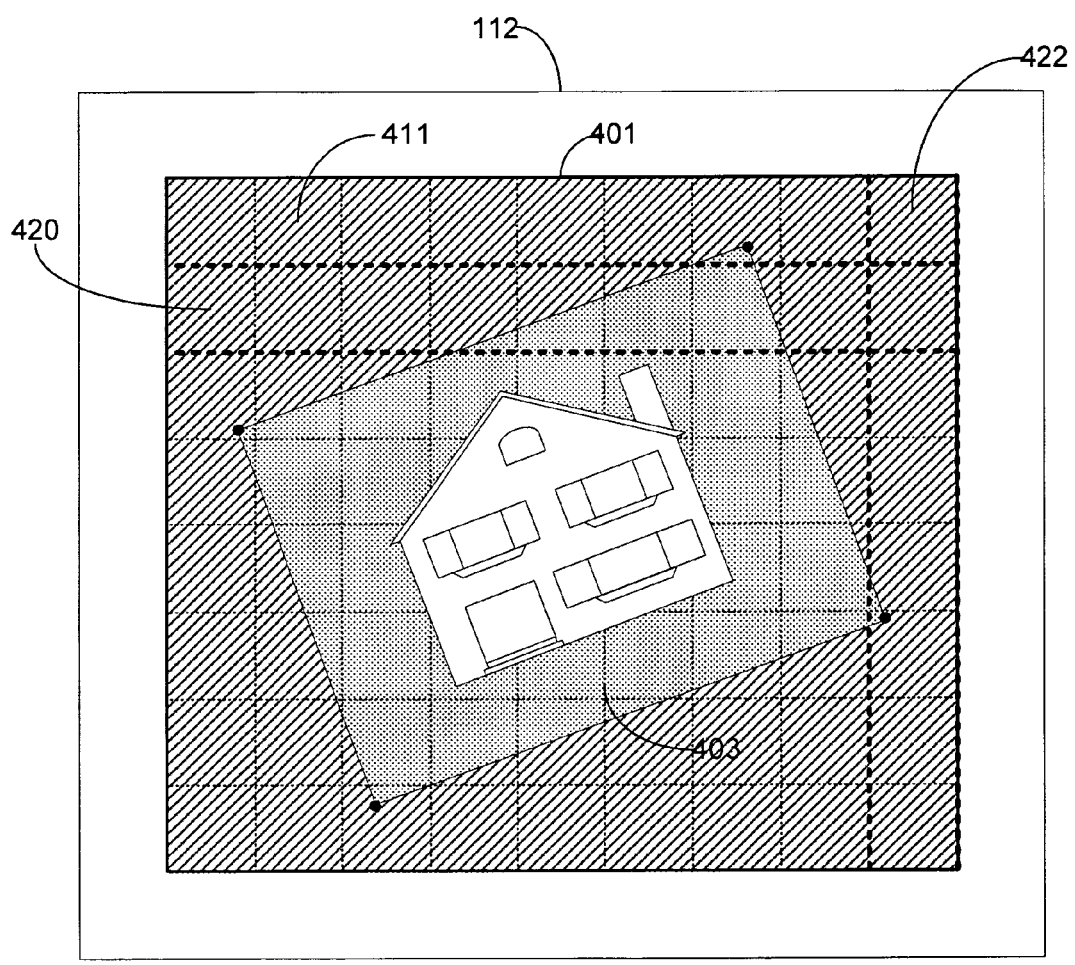
FIG. 4C illustrates the digital image being processed to identify edges of an image portion according one preferred embodiment.

In another embodiment, the identifying instructions 402 include instructions for identifying an edge of the image portion 403 as a function of pixel values within the image. As known to those skilled in the art, pixels within digital images 401 are arranged in rows and columns (see reference characters 420 and 422, respectively, of FIG. 4C). In this embodiment, the identifying instructions 402 include instructions for analyzing all of the pixels in each row to identify a vertical transition point at which pixels transition from a first value to a second value, and/or analyzing all of the pixels in each column to identify a horizontal transition point at which pixels transition from a first value to a significantly different second value. In this case, the first value corresponds to the border color, and second value corresponds to an image color. Thus, by analyzing pixels by rows and by columns, the identifying instructions 402 identify one or more pixel locations that correspond to a change in pixel color from a border color such as white to a non-border color (e.g., any color other than white). For example, if the digital image includes pixels with a one (1)-bit depth, the identifying instructions 402 identify pixels with a value of "0" (i.e., black) that are adjacent to pixels with a value of "1" (i.e., white). As a result of identifying transition points from a border color to a non-border color, the identify instructions identify each of the edges of the image portion 403.

In another embodiment, identifying instructions 402 include instructions for applying an "edge detection filter" to the original image. More specifically, identifying instructions 402 include instructions for applying an edge detection filter such as a Laplacian filter to process the digital image to distinguish the border portion 411 from the image portion 403 of the document. In some cases, the border portion 411 is not perfectly uniform in color. For example, if the scanning surface is not clean during the scanning process, the border portion 411 may include non-border colors that represent the unclean portions of the scanning surface. However, because an edge detection filter detects significant color transitions in the digital image (i.e., edges), such random color deviations in the border portion 411 of the digital image can be easily distinguished from the edges. As known to those skilled in the art, an edge detection filter works by superimposing a matrix such as shown in FIG. 4H over each of the pixels of the digital image, and applying a mathematical operation to each pixel to produce a new set of pixels. In the case of the filter shown in FIG. 4H, the brightness of each pixel value of the digital image along with the twelve closest neighboring pixels is multiplied by the values shown in the matrix and the results added together to create new pixels with new brightness values. The effect of the example filter is to produce areas of blackness where the original image doesn't change much (i.e., it exhibits near-continuous tones) and areas of whiteness where significant changes in brightness are occurring (i.e., at edges). As a result of processing the image with this filter, the transition points (i.e., the edges of the image portion) from the border portion 411 to the image portion 403 are easily identified.

Figure 4D:
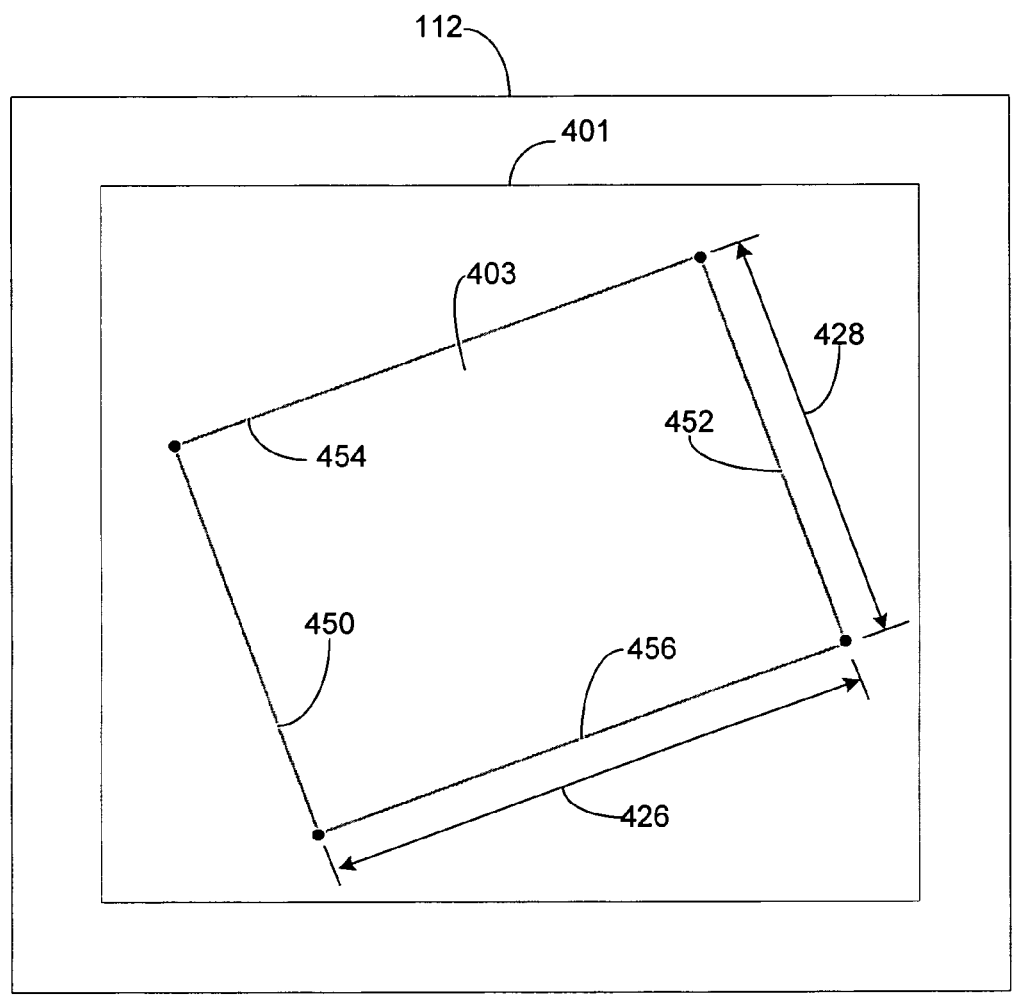
FIG. 4D illustrates a generated outline of the digital image.

Defining instructions 416 include instructions for defining one or more edges of the image from the identified pixels. In particular, after identifying instructions 402 identify points that correspond to the corners of the image portion 403, the defining instructions 416 connect identified corners to define a rectangular outline of the image. For example, defining instructions may employ a best-fit analysis to generate a rectangular outline of the image portion 403 (see FIG. 4D). In the case where the identifying instructions 402 identify edges 450, 452, 454, and 456, the defining instructions include instructions for grouping the vertical transition points to define left side and right side edges 450, 452, respectively, of the image portion 403, and grouping the horizontal transition points to define top and bottom edges 454, 456, respectively, of the image portion 403 (see FIG. 4D).

Determining instructions 417 include instructions for determining an orientation of the image relative to a target orientation as a function of the defined edges. In one embodiment, the determining instructions 417 include defining a reference axis. For example, the reference axis may be a horizontal axis 412 or a vertical axis 414. The determining instructions 417 also include instructions for comparing the defined outline to at least one reference axis. For instance, the defined right and left sides of the image are compared to the vertical axis to determine whether there is an orientation error between the identified edges and the reference axis. Similarly, the defined top and bottom sides of the image are compared to the horizontal axis to determine whether there is an orientation error between the identified edges and the reference axis.

In an alternative embodiment, determining instructions 417 include instructions for determining the orientation of the image as a function of the difference between coordinate values (i.e., horizontal and vertical positions) for adjacent corners. For example, as described above, four diagonal processing lines are moved toward a center of the target orientation until each of the processing lines intersects one of the pixels having a pixel value substantially different than previously processed pixels, and the location of each of the intersected pixels are recorded in memory. Because each of the four diagonal lines detects a particular corner of the image portion 403, the coordinates for each corner are known. If the bottom left corner and the bottom right corner have the same vertical position (e.g., same Y coordinate, or columnar value), the image portion 403 is determined not have an orientation error. If the bottom left corner and the bottom right corner do not have the same vertical position, the image portion 403 is determined have an error in orientation.

Figure 4E:
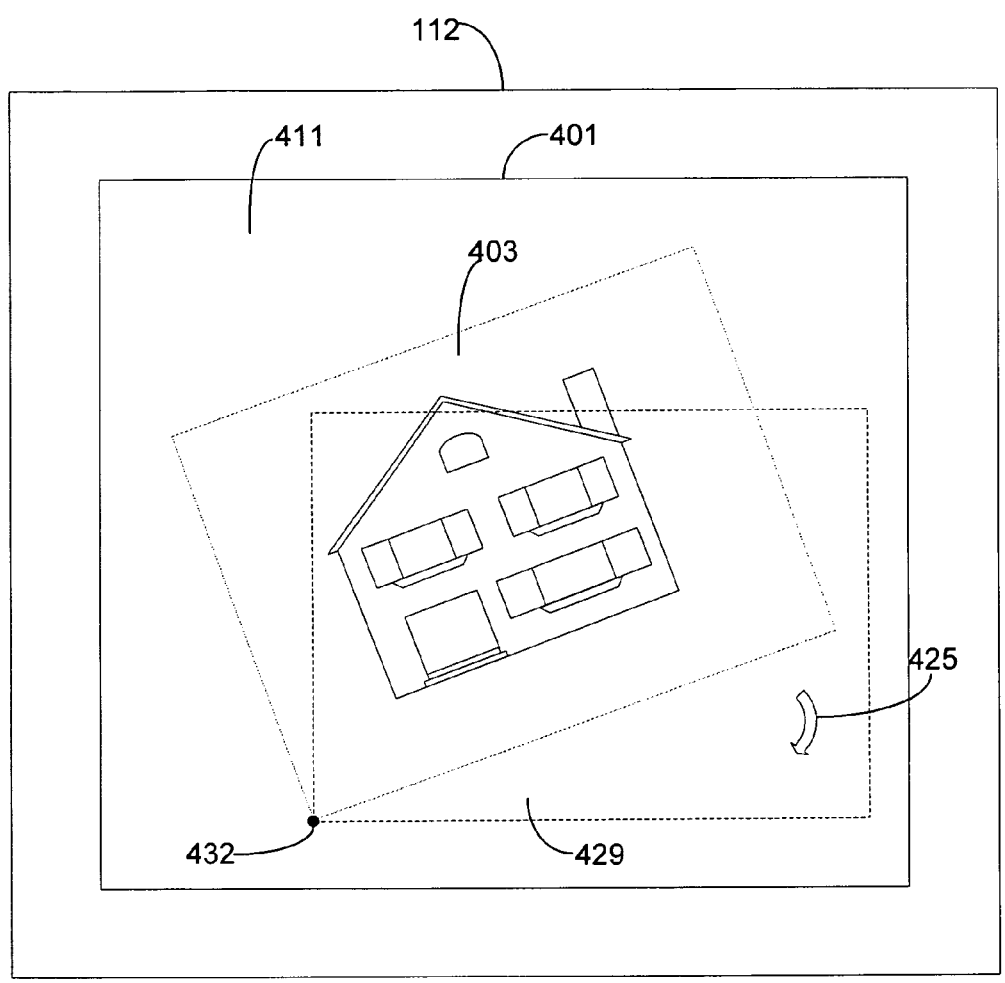
FIGS. 4E and 4F illustrate a digital image before adjustment and after adjustment, respectively.

Adjusting instructions 418 include instructions for adjusting the image portion 403 to correspond to a target image portion 429 such as shown in FIG. 4E. More specifically, adjusting instructions 418 include instructions for identifying a point of rotation 432, instructions for rotating the image about the identified point of rotation 432 in response to the determined orientation error, and instructions for adjusting the size of the identified image portion to correspond to a target image size. In one embodiment, the point of rotation 432 defaults to a particular corner such as the bottom left corner. In an alternative embodiment, the adjusting instructions are responsive to user input to define the point of rotation 432. For instance, the user using UI 110, and an input form (not shown) being displayed to the user 114 via the display 112 designates which corner is the point of rotation.

Figure 4F:
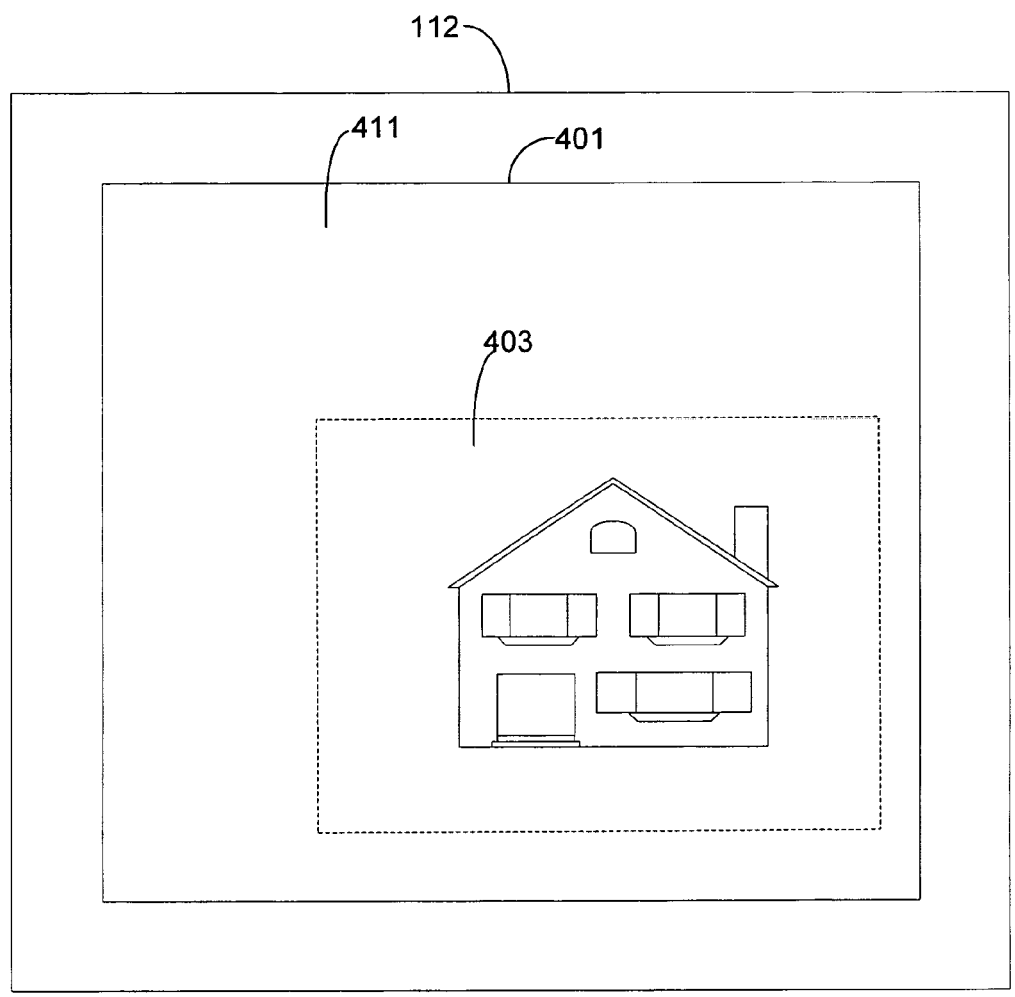

After the adjusting instructions 418 identify the point of rotation 432 (e.g., bottom left corner), the adjusting instructions 418 identify the adjacent bottom corner (i.e., bottom right corner) of the image portion. If the bottom left corner and bottom right corner do not have the same vertical position (i.e., orientation error), adjusting instructions 418 rotate the entire image portion, as indicated by reference character 425, around the point of rotation 432 (i.e., bottom left corner) until the bottom right corner and the bottom left corner have the same vertical position. (See FIGS. 4E and 4F). The adjusting instructions 418 then use a determined target width and target height to skew the rotated image to the correct size. For example, prior to rotating the image, the adjusting instructions 418 determine the width 426 of the image by calculating the distance between the bottom left corner and the bottom right corner of the defined rectangular outline of the image. (See FIG. 4D). Similarly, the adjusting instructions 418 determine a target height 428 by computing the distance between the bottom left corner and the top left corner of the defined rectangular outline. The adjusting instructions 418 include instructions for skewing the image portion so that the top left corner corresponds to a point on the target image outline (See FIG. 4E). For example, adjusting instructions 418 utilize the horizontal position of the bottom left corner and the calculated target height, to skew the image to adjust the top left corner to correspond to the target outline. In other words, the top left corner is adjusted to a position vertically aligned with the bottom left corner, and a distance equal to the determined height above the bottom left corner. Adjusting instructions 418 also include instructions for skewing the image portion so that the top right corner corresponds to a point on the target image outline (See FIG. 4F). In this way, the image portion is adjusted to a target orientation and size without prior knowledge of the width or height of the image portion.

Figure 4G:
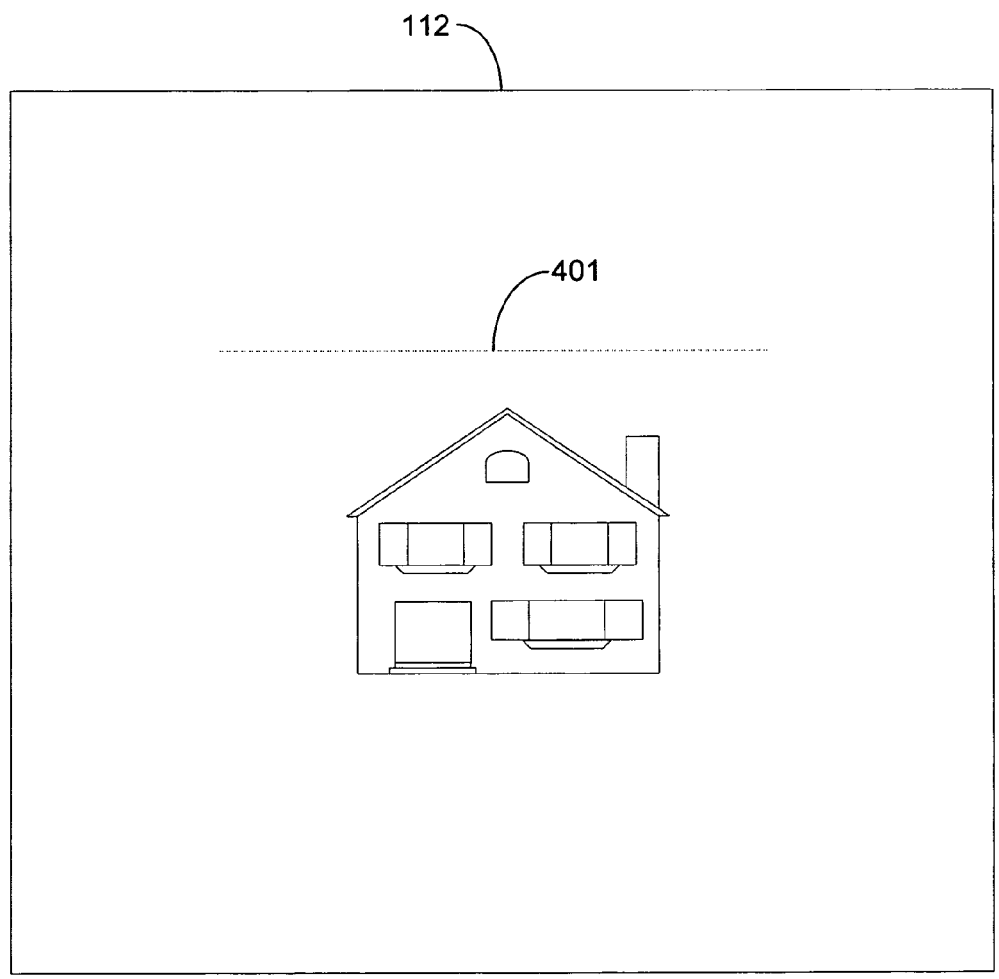
FIG. 4G is an exemplary screen shot illustrating digital image produced according to the present invention.
Figure 4H:
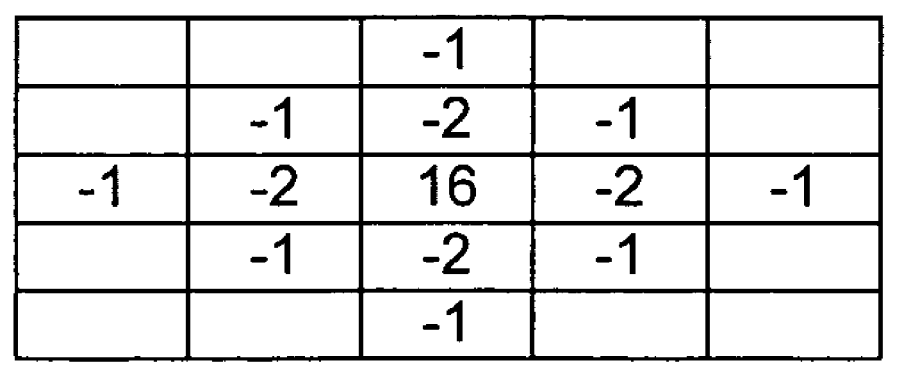

Cropping instructions 419 include instructions for employing traditional cropping, such as described above in reference to FIGS. 3A and 3B, to eliminate the border portion of the digital image. FIG. 4G is an exemplary screen shot showing a digital image that has been adjusted and cropped according to the invention. Because the image portion is now a rectangular shape and oriented exactly along the horizontal and vertical axes, traditional cropping can be used to eliminate the unwanted border portion.

Figure 5:
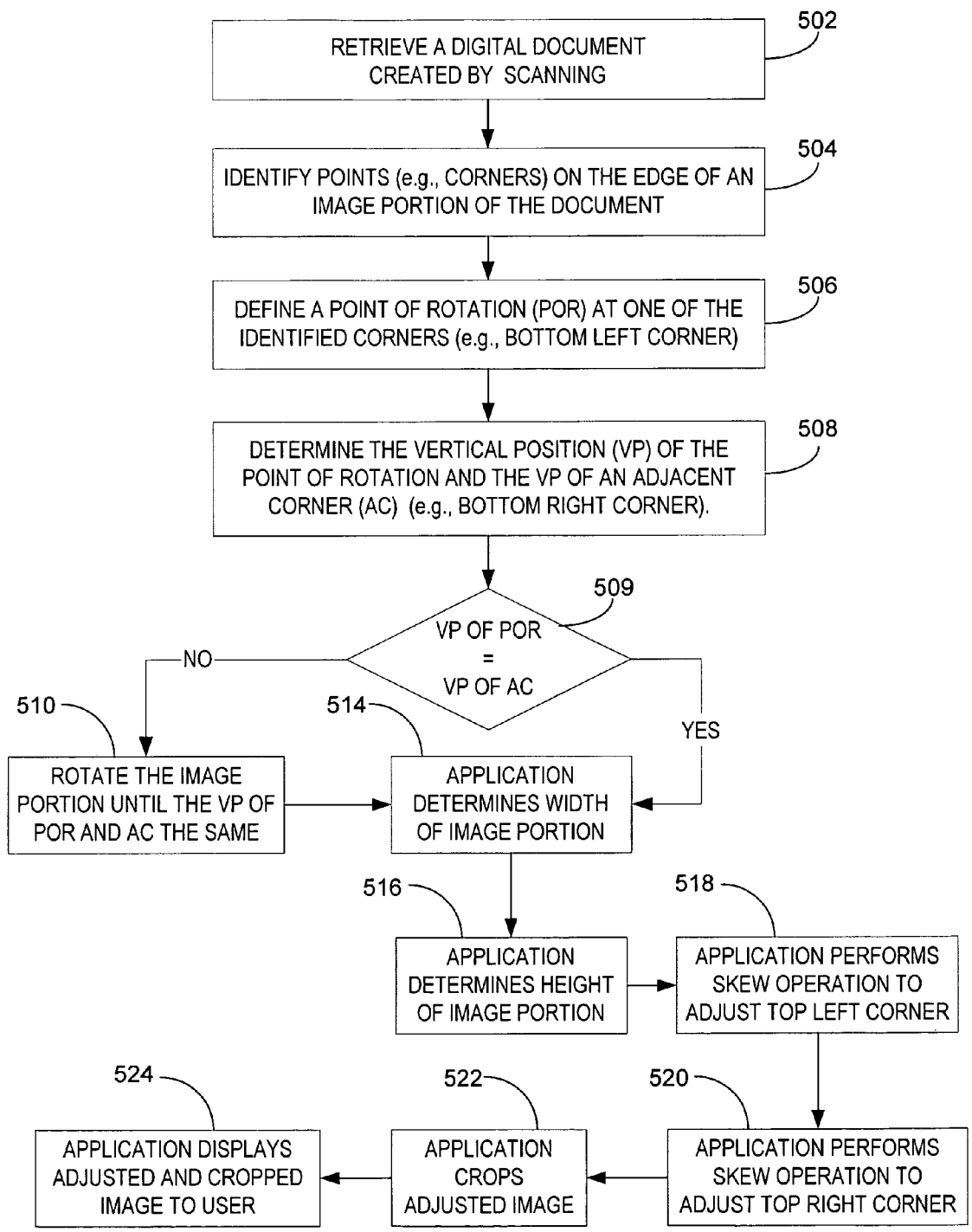
FIG. 5 is an exemplary flow chart illustrating a method for processing a digital image obtained by scanning according to one embodiment of the invention.

Referring now to FIG. 5, an exemplary flow chart illustrates a method for processing a digital image obtained by scanning according to one embodiment of the invention. A user using a computer retrieves a digital image file created by scanning for display on the monitor, and executes the application of the invention at 502. At 504, the application identifies corners of the image portion of the digital image as a function of pixel values. For example, the application utilizes four processing lines to identify a top right, top left, bottom right, and bottom left corner of the digital image. Each identified corner corresponds to the first pixel intersected by a processing line that has a pixel value (i.e., color) substantially different than previously processed pixels (see identifying instructions 402, FIG. 4A). A point of rotation is defined from one of the identified corners at 506. In this example, the point of rotation is defined as the bottom left corner. At 508, the adjacent bottom corner (i.e., bottom right corner) of the image portion is analyzed to determine if it has the same vertical position (e.g., same column value) as the bottom left corner (i.e., point of rotation). If it is determined that the bottom left corner and bottom right corner do not have the same vertical position at 509, the entire image portion is rotated around the bottom left corner until the bottom right corner and the bottom left corner have the same vertical position at 510. If it is determined that the bottom left corner and bottom right corner have the same vertical position at 509, rotation is not necessary and the application is ended at 512. At 514, the application determines the width of the image portion. The width of the image portion is determined for example, by calculating the distance between the bottom left corner and the bottom right corner. The application calculates the target height of the image portion by computing the distance between the bottom left corner and the top left corner at 516. Using the horizontal position of the bottom left corner and the calculated target height, a skew-operation is performed on the image portion to adjust the top left corner to correspond an ideal rectangle at 518. At 520 using the horizontal position of the bottom right corner and the calculated target height, a skew-operation is performed on the image portion to adjust the top right corner to correspond to the ideal rectangle. The application performs traditional cropping on the image at 522. In one preferred embodiment (not shown), skewing the left and/or right top corners is optional, and only occurs if the left and/or right top corners are not aligned with the ideal image size after rotation. At 524, the application displays the adjusted and cropped image to the user, and/or saves it to a computer readable medium (e.g., hard drive, diskette, etc.).

Figure 6:
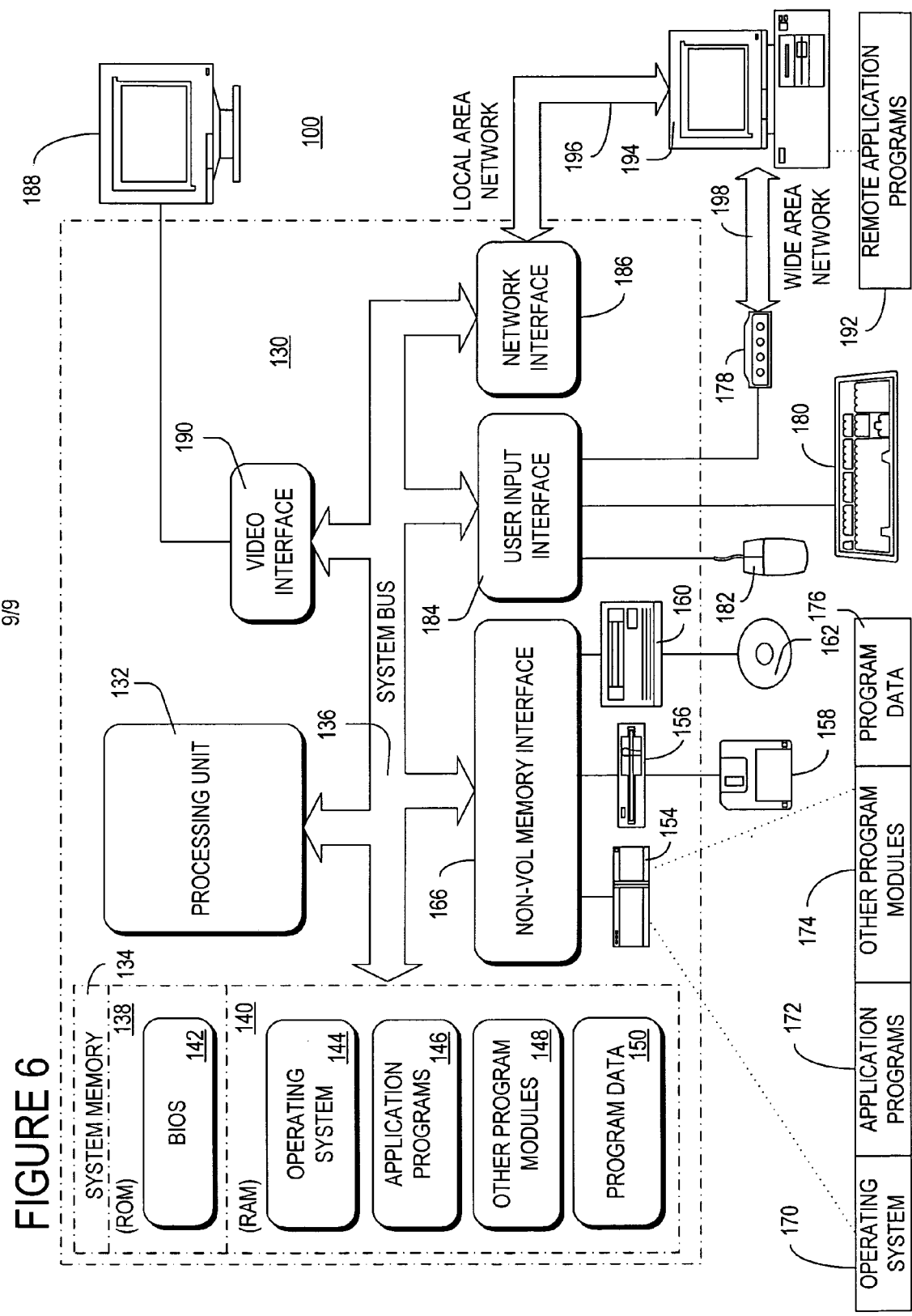
FIG. 6 is a block diagram illustrating one example of a suitable computing system environment in which the invention may be implemented.

FIG. 6 shows one example of a general purpose-computing device in the form of a computer 130. In one embodiment of the invention, a computer such as the computer 130 is suitable for use in the other figures illustrated and described herein. Computer 130 has one or more processors or processing units 132 and a system memory 134. In the illustrated embodiment, a system bus 136 couples various system components including the system memory 134 to the processors 132. The bus 136 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 130 typically has at least some form of computer readable media. Computer readable media, which include both volatile and nonvolatile media, removable and non-removable media, may be any available medium that can be accessed by computer 130. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computer 130. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of the any of the above are also included within the scope of computer readable media.

The system memory 134 includes computer storage media in the form of removable and/or non-removable, volatile and/or nonvolatile memory. In the illustrated embodiment, system memory 134 includes read only memory (ROM) 138 and random access memory (RAM) 140. A basic input/output system 142 (BIOS), containing the basic routines that help to transfer information between elements within computer 130, such as during start-up, is typically stored in ROM 138. RAM 140 typically contains data and/or program modules that are immediately accessible to and/or presently being operated on by processing unit 132. By way of example, and not limitation, FIG. 6 illustrates operating system 144, application programs 146, other program modules 148, and program data 150.

The computer 130 may also include other removable/non-removable, volatile/nonvolatile computer storage media. For example, FIG. 6 illustrates a hard disk drive 154 that reads from or writes to non-removable, nonvolatile magnetic media. FIG. 6 also shows a magnetic disk drive 156 that reads from or writes to a removable, nonvolatile magnetic disk 158, and an optical disk drive 160 that reads from or writes to a removable, nonvolatile optical disk 162 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 154, and magnetic disk drive 156 and optical disk drive 160 are typically connected to the system bus 136 by a non-volatile memory interface, such as interface 166.

The drives or other mass storage devices and their associated computer storage media discussed above and illustrated in FIG. 6, provide storage of computer readable instructions, data structures, program modules and other data for the computer 130. In FIG. 6, for example, hard disk drive 154 is illustrated as storing operating system 170, application programs 172, other program modules 174, and program data 176. Note that these components can either be the same as or different from operating system 144, application programs 146, other program modules 148, and program data 150. Operating system 170, application programs 172, other program modules 174, and program data 176 are given different numbers here to illustrate that, at a minimum, they are different copies.

A user may enter commands and information into computer 130 through input devices or user interface selection devices such as a keyboard 180 and a pointing device 182 (e.g., a mouse, trackball, pen, or touch pad). Other input devices (not shown) may include a microphone, joystick, game pad, satellite dish, scanner, or the like. These and other input devices are connected to processing unit 132 through a user input interface 184 that is coupled to system bus 136, but may be connected by other interface and bus structures, such as a parallel port, game port, or a Universal Serial Bus (USB). A monitor 188 or other type of display device is also connected to system bus 136 via an interface, such as a video interface 190. In addition to the monitor 188, computers often include other peripheral output devices (not shown) such as a printer and speakers, which may be connected through an output peripheral interface (not shown).

The computer 130 may operate in a networked environment using logical connections to one or more remote computers, such as a remote computer 194. The remote computer 194 may be a personal computer, a server, a router, a network PC, a peer device or other common network node, and typically includes many or all of the elements described above relative to computer 130. The logical connections depicted in FIG. 6 include a local area network (LAN) 196 and a wide area network (WAN) 198, but may also include other networks. LAN 136 and/or WAN 138 can be a wired network, a wireless network, a combination thereof, and so on. Such networking environments are commonplace in offices, enterprise-wide computer networks, intranets, and global computer networks (e.g., the Internet).

When used in a local area networking environment, computer 130 is connected to the LAN 196 through a network interface or adapter 186. When used in a wide area networking environment, computer 130 typically includes a modem 178 or other means for establishing communications over the WAN 198, such as the Internet. The modem 178, which may be internal or external, is connected to system bus 136 via the user input interface 184, or other appropriate mechanism. In a networked environment, program modules depicted relative to computer 130, or portions thereof, may be stored in a remote memory storage device (not shown). By way of example, and not limitation, FIG. 6 illustrates remote application programs 192 as residing on the memory device. It will be appreciated that the network connections shown are exemplary and other means of establishing a communications link between the computers may be used.

Generally, the data processors of computer 130 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described herein.

For purposes of illustration, programs and other executable program components, such as the operating system, are illustrated herein as discrete blocks. It is recognized, however, that such programs and components reside at various times in different storage components of the computer, and are executed by the data processor(s) of the computer.

Although described in connection with an exemplary computing system environment, including computer 130, the invention is operational with numerous other general purpose or special purpose computing system environments or configurations. The computing system environment is not intended to suggest any limitation as to the scope of use or functionality of the invention. Moreover, the computing system environment should not be interpreted as having any dependency or requirement relating to any one or combination of components illustrated in the exemplary operating environment. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include, but are not limited to, routines, programs, objects, components, and data structures that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

In operation, computer 130 executes computer-executable instructions such as those illustrated in FIG. 4A to adjust and/or crop an image obtained by scanning.

Those skilled in the art will note that the order of execution or performance of the methods illustrated and described herein is not essential, unless otherwise specified. That is, elements of the methods may be performed in any order, unless otherwise specified, and that the methods may include more or less elements than those disclosed herein.

When introducing elements of the present invention or the embodiment(s) thereof, the articles "a," "an," "the," and "said" are intended to mean that there are one or more of the elements. The terms "comprising," "including," and "having" are intended to be inclusive and mean that there may be additional elements other than the listed elements.

In view of the above, it will be seen that the several objects of the invention are achieved and other advantageous results attained.

As various changes could be made in the above constructions and methods without departing from the scope of the invention, it is intended that all matter contained in the above description and shown in the accompanying drawings shall be interpreted as illustrative and not in a limiting sense.

What is claimed is:

1. A computerized method for processing an image obtained by scanning, said image being a substantially rectangular shape having four corners and including at least a plurality of pixels, said pixels each having a value representative of an optical characteristic of a scanned object, said method comprising:

identifying a plurality of pixels along at least one edge portion of the image as a function of the pixel values, said identifying the pixels along the edge portion of the image including processing the image as a function of pixel values to identify corners of the image, said processing the image to identify corners including:

defining a plurality of at least substantially diagonal processing lines relative to the target orientation, each processing line having a first position tangentially aligned to a different corner of the image;

repositioning each of the processing lines a predetermined distance towards a center of the target orientation until each of the processing lines intersects one of the pixels having a pixel value substantially different than previously processed pixels; and recording a location of each of the intersected pixels;

defining one or more edges of the image from the identified pixels;

determining an orientation of the image relative to a target orientation as a function of the defined edges; and adjusting the orientation of the image portion to correspond to the target orientation.

2. The computerized method of claim 1, wherein identifying the pixels along the edge portion of the image includes distinguishing the edge portion of the image from a border portion of the image adjacent the edge portion, said pixels along the edge portion of the image having substantially different pixel values than said pixels in the border portion of the image.

3. The computerized method of claim 2 further comprising cropping the adjusted image to eliminate the border portion.

4. The computerized method of claim 1, wherein defining the edges of the image includes matching the identified pixels to a predefined shape.

5. The computerized method of claim 1, wherein processing the image includes:
defining at least one horizontal processing line relative to the target orientation, said horizontal processing line having a first position coincident with a top side or a bottom side of the image;
defining at least one vertical line relative to the target orientation, said vertical processing line having a first position coincident with a right side or a left side of the image;
repositioning each of the horizontal and vertical lines a predetermined distance towards a center of the target orientation until each of the processing lines intersects a pixel having a pixel value substantially different than previously processed pixels; and
recording a location of each of the intersected pixels.

6. The computerized method of claim 1, wherein the plurality of pixels are arranged in rows and columns, and wherein identifying the pixels along the edge portion of the image includes:
analyzing each column to identify a horizontal transition point at which pixels transition from a first value to a second value, said first and second values being substantially different from each other;
grouping the horizontal transition points to identify top and bottom edges of the image.

7. The computerized method of claim 1, wherein the plurality of pixels are arranged in rows and columns, and wherein identifying the pixels along the edge portion of the image includes:
analyzing each row to identify a vertical transition point at which pixels transition from a first value to a second value, said first and second values being substantially different from each other; and
grouping the vertical transition points to identify left side and right side edges of the image.

8. The computerized method of claim 1, further comprising applying a Laplacian filter to each pixel to identify one or more transition points between adjacent pixels.

9. The computerized method of claim 1, wherein determining an orientation of the image includes:
defining a reference axis;
grouping the identified pixels to define an outline of the image;
comparing the defined outline to the reference axis; and
determining an orientation error between the determined orientation of the image and the target orientation as a function of the comparison.

10. The computerized method of claim 9, wherein the adjusting includes:
identifying a point of rotation; and
rotating the image about the identified point of rotation in response to the determined orientation error.

11. The computerized method of claim 9, wherein the adjusting further includes sizing the image to correspond to a target size.

12. One or more computer-readable media having computer-executable instructions for performing the method of claim 1.

13. A computer-readable medium having computer-executable instructions for processing a digital image, said digital image including a border portion and an image portion, wherein the border portion and the image portion each include at least a plurality of pixels, said pixels each having a value representative of an optical characteristic of a scanned object, and wherein the image portion is a substantially rectangular shape having four corners, comprising:
identifying instructions for identifying a plurality of pixels along at least one edge portion of the image portion as a function of the pixel values, wherein said pixels in the border portion have substantially different pixel values than said pixels in the image portion of the image, wherein said pixels along the edge portion of the digital image distinguish the image portion of the digital image from the border portion adjacent the edge portion, wherein said identifying instructions for identifying the pixels along the edge portion of the image portion includes processing the digital image as a function of pixel values to identify corners of the image, and wherein processing the digital image to identify corners includes:
defining a plurality of diagonal processing lines relative to the target orientation, each diagonal processing line having a first position tangentially aligned to a different corner of the image;
repositioning each of the diagonal processing lines a predetermined distance toward a center of the target orientation until each of the processing lines intersects one of the pixels having a pixel value substantially different than previously processed pixels; and
recording a location of each of the intersected pixels;
defining instructions for defining one or more edges of the image portion from the identified pixels;
determining instructions for determining an orientation of the image portion relative to a target orientation as a function of the defined edges;
adjusting instructions for adjusting the orientation of the image portion to correspond to the target orientation; and
cropping instructions for cropping the adjusted image portion to eliminate the border portion.

14. The computer-readable medium of claim 13, wherein defining the edges of the image portion includes matching the identified pixels to a predefined shape.

15. The computer-readable medium of claim 13, wherein the plurality of pixels are arranged in rows and columns, and wherein identifying instructions for identifying the pixels along the edge portion of the image portion includes:
analyzing each column to identify a horizontal transition point at which pixels transition from a first value to a second value, said first and second values being substantially different from each other; and
grouping the horizontal transition points to identify top and bottom edges of the image portion.

16. The computer-readable medium of claim 13, wherein the plurality of pixels are arranged in rows and columns, and wherein identifying instructions for identifying the pixels along the edge portion of the image portion includes:
analyzing each row to identify a vertical transition point at which pixels transition from a first value to a second value, said first and second values being substantially different from each other; and
grouping the vertical transition points to identify left side and right side edges of the image portion.

17. The computer-readable medium of claim 13, wherein determining instructions for determining an orientation of the image portion include:

defining a reference axis;
grouping the identified pixels to define an outline of the image portion;
comparing the defined outline to the reference axis;
determining an orientation error between the determined orientation of the image portion and the target orientation as a function of the comparison; and
sizing the image portion to correspond to a target size.

18. The computer-readable medium of claim 17, wherein the adjusting instructions include:
identifying a point of rotation; and
rotating the image about the identified point of rotation in response to the determined orientation error.

19. A system for processing an image, said image being a substantially rectangular shape having four corners and including at least a plurality of pixels, said pixels each having a value representative of an optical characteristic of a scanned object, said system storing computer-executable instructions to do the following:
identifying a plurality of pixels along at least one edge portion of the image as a function of the pixel values, said identifying the pixels along the edge portion of the image including processing the image as a function of pixel values to identify corners of the image said processing the image including:
defining a plurality of at least substantially diagonal processing lines relative to the target orientation, each processing line having a first position tangentially aligned to a different corner of the image;
repositioning each of the processing lines a predetermined distance towards a center of the target orientation until each of the processing lines intersects one of the pixels having a pixel value substantially different than previously processed pixels; and
recording a location of ach of the intersected pixels;
defining one or more edges of the image from the identified pixels;
determining an orientation of the image relative to a target orientation as a function of the defined edges;
adjusting the orientation of the image portion to correspond to the target orientation; and
cropping the adjusted image to eliminate the border portion.

20. The system of claim 19, wherein identifying the pixels along the edge portion of the image includes distinguishing the edge portion of the image from a border portion of the image adjacent the edge portion, said pixels along the edge portion of the image having substantially different pixel values than said pixels in the border portion of the image.

21. The system of claim 19, wherein defining the edges of the image includes matching the identified pixels to a predefined shape.

22. The system of claim 19, wherein the plurality of pixels are arranged in rows and columns, and wherein identifying the pixels along the edge portion of the image includes:
analyzing each column to identify a horizontal transition point at which pixels transition from a first value to a second value, said first and second values being substantially different from each other;
grouping the horizontal transition points to identify top and bottom edges of the image.

23. The system of claim 19, wherein the plurality of pixels are arranged in rows and columns, and wherein identifying the pixels along the edge portion of the image includes:
analyzing each row to identify a vertical transition point at which pixels transition from a first value to a second value, said first and second values being substantially different from each other; and
grouping the vertical transition points to identify left side and right side edges of the image.

24. The system of claim 19, wherein determining an orientation of the image includes:
defining a reference axis;
grouping the identified pixels to define an outline of the image;
comparing the defined outline to the reference axis;
determining an orientation error between the determined orientation of the image and the target orientation as a function of the comparison; and
sizing the image to correspond to a target size.

25. The computerized method of claim 24, wherein the adjusting includes:
identifying a point of rotation; and
rotating the image about the identified point of rotation in response to the determined orientation error.

* * * * *

UNITED STATES PATENT AND TRADEMARK OFFICE
CERTIFICATE OF CORRECTION

PATENT NO.         : 6,956,587 B1                                                 Page 1 of 1
APPLICATION NO. : 10/697729
DATED              : October 18, 2005
INVENTOR(S)        : David L. A. Anson It is certified that error appears in the above-identified patent and that said Letters Patent is hereby corrected as shown below:

In column 8, line 9, after "image" delete ".".

In column 15, line 24, in Claim 19, after "image" insert -- , --.

In column 15, line 35, in Claim 19, delete "ach" and insert -- each --, therefor.

Signed and Sealed this

Eighth Day of September, 2009

David J. Kappos
*Director of the United States Patent and Trademark Office*